(12) United States Patent
Hwang (10) Patent No.: US 7,356,070 B2
(45) Date of Patent: Apr. 8, 2008

(54) APPARATUS FOR RECOGNIZING MOBILE SIGNALS IN MOBILE COMMUNICATION SYSTEM, AND METHOD THEREFOR

(75) Inventor: Bong Jun Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 709 days.

(21) Appl. No.: 10/735,766

(22) Filed: Dec. 16, 2003

(65) Prior Publication Data
US 2004/0127213 A1    Jul. 1, 2004

(30) Foreign Application Priority Data
Dec. 17, 2002    (KR) ..................... 10-2002-0080867

(51) Int. Cl.
*H04B 1/707* (2006.01)
(52) U.S. Cl. .................................... 375/147
(58) Field of Classification Search ............... 375/224, 375/130, 140, 147, 316, 148
See application file for complete search history.

(56) References Cited
U.S. PATENT DOCUMENTS
2003/0139140 A1* 7/2003 Chen et al. ................ 455/67.1

FOREIGN PATENT DOCUMENTS
GB    2370725 A  *  7/2002

* cited by examiner

*Primary Examiner*—Kevin Burd
(74) *Attorney, Agent, or Firm*—Ked & Associates, LLP

(57) ABSTRACT

A method and apparatus for recognizing signals in a mobile communication system reduces a mean acquisition time based on a signal-to-noise ratio of a received signal and the moving speed of user equipment which transmitted the signal. This apparatus includes a multi-path searcher of a base station modem which analyzes a signal from the moving user equipment using a Doppler estimator, decides the moving speed of the user equipment, and transmits a control signal proportional to the moving speed to coherent and non-coherent accumulators. A signal-to-interference ratio estimator then decides a signal-to-noise ratio of the signal and compensates for a control signal transmitted to each accumulator. Through this approach, higher reliability is achieved than other multi-path searchers, which merely consider the moving speed of the user equipment. Also, a mean acquisition time taken to recognize and search signals and an initial synchronization time are reduced and wireless resources of a base station are saved.

33 Claims, 5 Drawing Sheets

APPARATUS FOR RECOGNIZING MOBILE SIGNALS IN MOBILE COMMUNICATION SYSTEM, AND METHOD THEREFOR

BACKGROUND OF THE INVENTION

1. Field of the Invention

This invention generally relates to mobile communication systems, and more particularly to a method and apparatus for recognizing mobile signals in a receiving base station.

2. Description of the Related Art

The first mobile communication system was provided in Saint Louis of the USA in 1946 using 150 MHz of frequency bandwidth. Systems of this type have developed into various complicated structures to enable users to talk over the phone with anybody, anytime, anywhere. Seeing the value in there systems, the number of subscribers of mobile communication systems has tremendously increased, especially in recent years.

There are increasing demands for fast, high-quality, mobile communication services. However, general frequency division multiple access (FDMA) or time division multiple access (TDMA) are not satisfactory due to limited frequencies. In order to solve the foregoing problems, CDMA has been introduced. CDMA provides many technical benefits such as large call capacity and high-quality call services. Even with these improvements, there are strong demands for better services. In terms of quality of service, users demand fast and stable services for mobile terminals, especially ones moving at high speed User equipment (UE) registered in mobile communication systems allow users to communicate with anyone, anytime, anywhere. However, UEs have technical defects. For example, when a user moves at a high rate of speed in a car, unit time data rate tends to decrease and bit error rate (BER) tends to increase, thereby generating noise and/or call interruptions calls. In an attempt to overcome these drawbacks, a number of related technologies have been developed and are still being researched.

A mobile communication base station must always receive constant-level signals to provide stable services regardless of whether UEs are moving at a high or low speed rate of speed. The moving speed of each UE is decided according to the Doppler effect. UE signals received by a base station modem include unnecessary signals or noise.

Communication signals carrying information are digitally transmitted in a CDMA mobile communication system, and received signals have noise. A receiving end uses a method for accumulating a plurality of constant window unit signals in a synchronous status in order to separate pure communication signals from noise.

In a method which accumulates window signals having the same phase, when adjacent signals are presumed to have the same phase, an accumulated level increases according to the square of the sum of the accumulated signal sizes. When various types of noise are present, they have different phases and thus can be partially offset. The principle that the size of accumulated noise becomes the sum of the square of noise sizes is used in this case. For example, when signals are 5 and noises are 5 (namely at the ratio of 1 to 1), the accumulated signals are $(5+5)^2=100$ and the accumulated noises are $5^2+5^2=50$, namely the ratio of 2 to 1 according to the above accumulation. That is, this method improves a signal-to-noise ratio (SNR).

Signals often accumulated in slot units (often called coherent multi-slot accumulation) are also used to improve SNR. Another method known as non-coherent multi-slot accumulation accumulates energy of signals in slot units to increase energy of signals. In these methods, when the UE moves at high speed, a weight is applied to the non-coherent multi-slot accumulation. Conversely, when the UE moves at low speed, a weight is applied to the coherent multi-slot accumulation.

A method for recognizing signals in a multi-path searcher of a general base station modem will now be explained with reference to the accompanying drawings.

Figure 1:
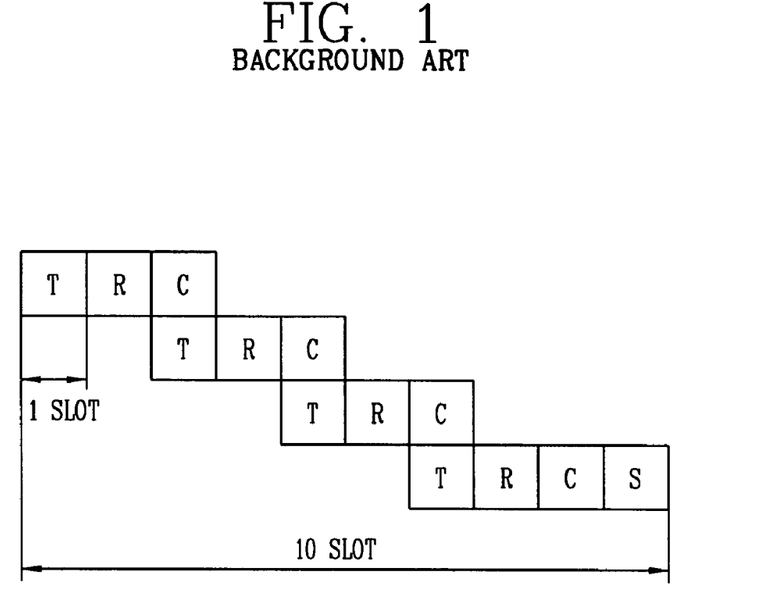
FIG. 1 shows a searching process time for non-coherent multi-slot accumulation in accordance with the related art when $L_{slot}$ is 4.

FIG. 1 illustrates a total searching process time for an accumulation slot number $L_{slot}$ according to the non-coherent multi-slot accumulation, specifically a real non-coherent multi-slot accumulation process for receiving and accumulating signals of the UE moving at high speed and with increasing energy. In this figure, when the accumulation slot number $L_{slot}$ is 4, non-coherent multi-slot accumulation is performed with four kinds of slots: T slot, R slot, C slot, and S slot.

The T (Throw process) slot is a task processor area for recording data values for mobile communication of the UE. The T slot is a slot for reading parameter information such as subscriber numbers, pseudo noise (PN) code values, and synchronous position values, and has a constant time period. The R (Run process) slot is a slot for calculating energy values of signals. The C (Catch process) slot is a slot for temporarily storing the resultant values. And, the S (Sort process) slot is a slot for sequentially sorting the energy values calculated in the R slot.

As shown, the T slot is processed below the C slot. The C slot is not a processing process but a temporary storing process, and thus can perform another process at the same time. Accordingly, the T slot is processed during the C slot. In addition, when the accumulation number is 4, the T, R and C slots are repeated four times and then the S slot is processed. A total of 10 slots of signal-searching process time is taken, as represented by following formula:

Non-coherent searching process time=$[2(1+L_{slot})]$ slot

Figure 2:
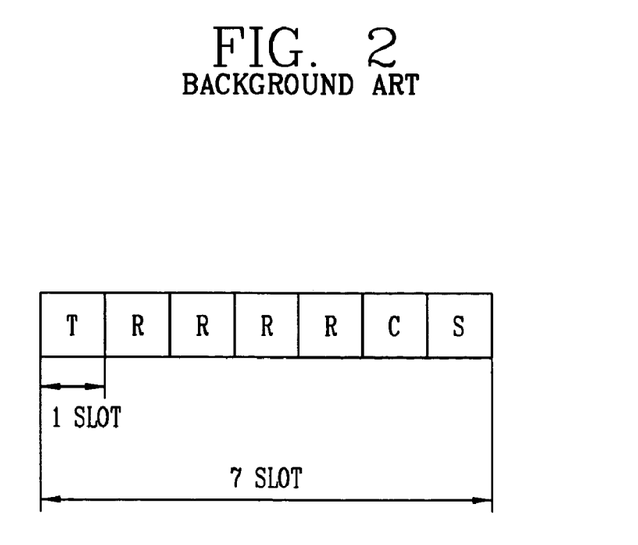
FIG. 2 shows a searching process time for coherent multi-slot accumulation in accordance with the related art when $M_{slot}$ is 4.

FIG. 2 illustrates a total searching process time for an accumulation slot number $M_{slot}$ according to the coherent multi-slot accumulation for receiving and accumulating signals of a UE moving at low speed, for example, when the accumulation slot number $M_{slot}$ is 4. As shown, the searching process performed using the coherent multi-slot accumulation includes four slots such as T slot, R slot, C slot and S slot. However, different from non-coherent multi-slot accumulation, the C and T slots are not processed at the same time, the R slot is repeated four times after the first T slot, and the C and S slots are sequentially processed.

Also during this searching process, a total of 7 slots of signal searching process time is taken, as represented by following formula:

Coherent searching process time=$[3+M_{slot}]$slot

When the same number of slots are accumulated, the coherent multi-slot accumulation shows better properties than non-coherent multi-slot accumulation. As a result, it is advantageous in a mean acquisition time which is an average searching process time for recognizing received signals in the multi-path searcher of the base station modem.

Figure 3:
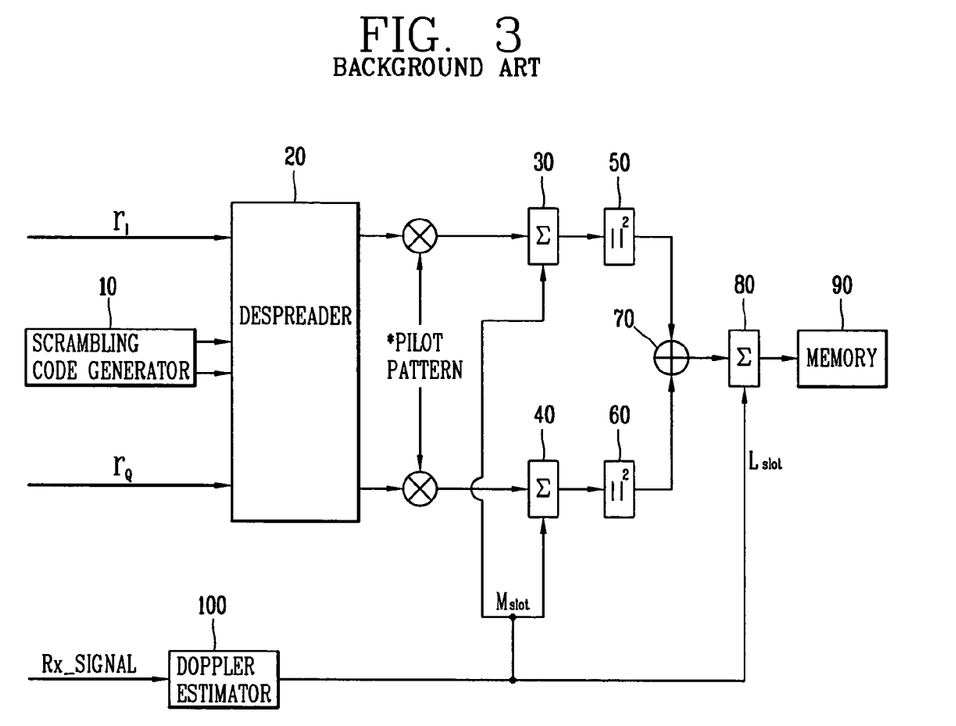
FIG. 3 shows a structure of an apparatus for recognizing signals in a multi-path searcher of a general base station modem in accordance with the related art.

FIG. 3 shows an apparatus for recognizing signals in a multi-path searcher of a base station modem using coherent and non-coherent multi-slot accumulation functions, and also using a Doppler estimator for deciding an accumulation slot number. The apparatus for recognizing signals in the multi-path searcher of the base station modem includes a scrambling code generator 10, a despreader 20, a first coherent accumulator 30, a second coherent accumulator 40, a first squaring circuit 50, a second squaring circuit 60, an adder 70, a non-coherent accumulator 80, a memory 90 and a Doppler estimator 100.

The despreader 20 applies a scrambling code signal to an I-channel signal $r_I$ and a Q-channel signal $r_Q$, received from an antenna and divided into an in-phase (I) channel and a quadrature-phase (Q) channel, to despread the signals. The scrambling code generator 10 generates the scrambling code signal and transmits the signal to the despreader 20. The first and second coherent accumulators 30 and 40 multiply the output signals from the despreader 20 by a pilot signal, and accumulate the resulting signals. The first and second squaring circuits 50 and 60 square each of the accumulated signals and extract size elements of the signals. The adder 70 adds up the output signals from the first and second squaring circuits and outputs the resultant value. The non-coherent accumulator 80 accumulates signal sizes of the signals from the adder. The memory 90 sequentially stores the output signals from the non-coherent accumulator. The Doppler estimator 100 measures the moving speed of the UE and transmits a control signal proportional to the moving speed to the first and second coherent accumulators 30 and 40 and the non-coherent accumulator 80.

Figure 4:
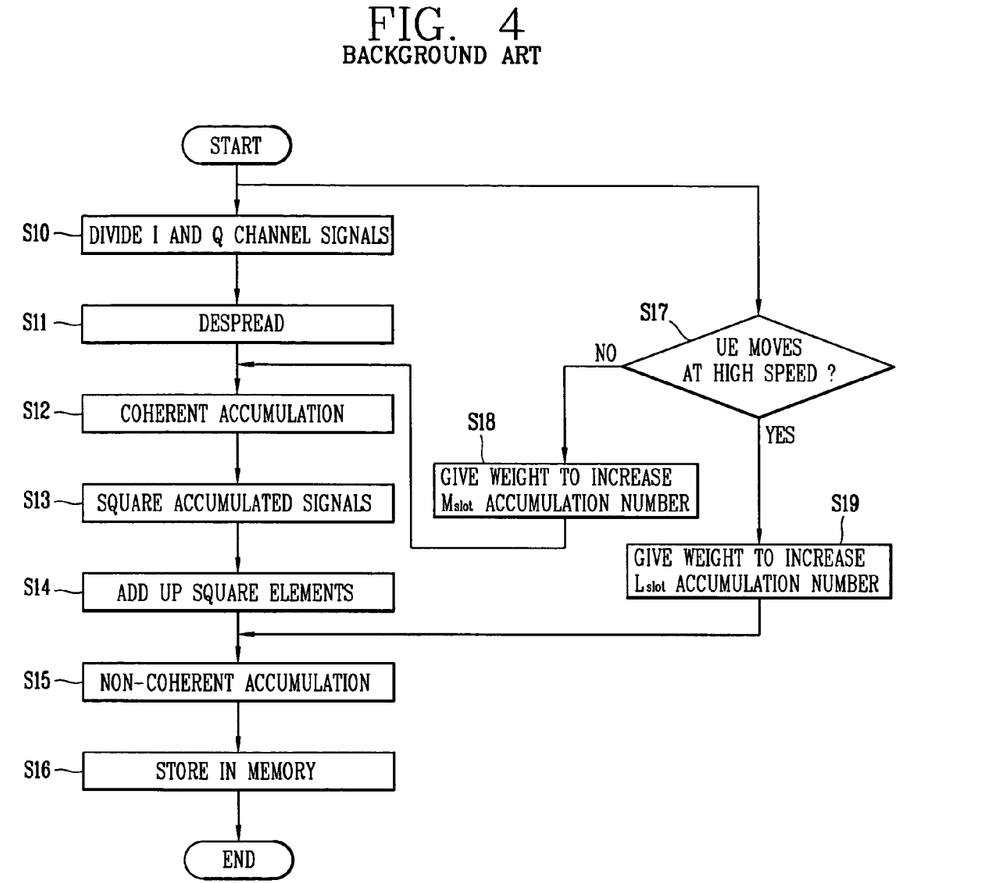
FIG. 4 is a flowchart showing steps included in a process for searching signals using the apparatus for recognizing signals in the multi-path searcher of a base station modem in accordance with the related art.

FIG. 4 is a flowchart showing sequential steps of a process for searching signals performed by the aforementioned apparatus for recognizing signals in the multi-path searcher of the base station modem. As shown, a signal received by the base station is divided into a complex type I-channel signal $r_I$ and Q-channel signal $r_Q$ through a transmission channel (S10). The despreader receives the I-channel signal $r_I$ and Q-channel signal $r_Q$, and applies a scrambling code from the scrambling code generator for spreading to the I-channel signal $r_I$ and Q-channel signal $r_Q$, thereby despreading the signals (S11).

The Doppler estimator receives the signals from the base station antenna analyzes and processes the received signals according to the Doppler effect, to decide the moving speed of the UE (S17), and outputs a control signal based on the moving speed under the preset standards. When the analyzed moving speed is high, the Doppler estimator outputs a control signal for adding a weight to $L_{slot}$ to increase an accumulation slot number in the non-coherent accumulator (S18), and when the analyzed moving speed is low, the Doppler estimator outputs a control signal for adding a weight to $M_{slot}$ to increase an accumulation slot number in the coherent accumulator (S19).

The first and second coherent accumulators receive the despread signals from the despreader and multiply the signals by pilot patterns. The resulting symbol unit signals become $N_{pilot}$ pilot symbols. The first and second coherent accumulators accumulate the whole pilot symbols in the pilot symbol period, and also accumulate signals in the $M_{slot}$-1 slot pilot symbol period according to the given $M_{slot}$ number (S12). The first and second squaring circuits square the signals accumulated for the predetermined time, and extract size elements $E_I$ and $E_Q$ of the signals (S13). The adder adds up the square elements of the I and Q signals from the first and second squaring circuits, to obtain one energy $E_{total}$ (S14). Here, the energy value is a signal size in that phase. Thereafter, the non-coherent accumulator accumulates the energy signal $E_{total}$ from the adder by the given $L_{slot}$ (S15). The memory sequentially stores the output signals from the non-coherent accumulator as searching energy values (S16).

In this process, the signals before the adder are pairs of I and Q signals, and each of the blocks is embodied in pairs (S10~S13). However, the Doppler estimator merely considers the moving speed of the UE. Even if the moving speed of the UE is high, if the SNR is low, performance is not improved in the non-coherent multi-slot accumulation.

Moreover, a mean acquisition time which is an average time taken to recognize received signals in the base station modem is longer in the non-coherent multi-slot accumulation than the coherent multi-slot accumulation. Accordingly, it is meaningless to give the weight to the non-coherent accumulator.

In addition, an initial synchronization time may be delayed longer and wireless resources of the base station may be spent wastefully. That is, the Doppler estimator which merely considers the moving speed of the UE in giving the weight to the coherent accumulator and the non-coherent accumulator is inefficient.

SUMMARY OF THE INVENTION

An object of the present invention is to solve one or more of the above problems and to achieve at least one of the following advantages.

Another object of the present invention is to provide a method and apparatus for recognizing mobile signals in a mobile communication system which efficiently searches and recognizes the mobile signals.

Another object of the present invention is to provide a method and apparatus for recognizing mobile signals in a mobile communication system which restricts delays of a mean acquisition time and a synchronization time in a base station modem.

Another object of the present invention is to provide a method and apparatus for recognizing mobile signals in a mobile communication system which controls a weight in consideration of a signal-to-noise ratio.

In order to achieve these and/or other objects and advantages, the present invention provides a method and apparatus which recognizes mobile signals by controlling a weight intended to be given to a non-coherent accumulator according to a signal-to-noise ratio of a received signal in a wireless system operating a multi-path searcher of a base station modem. Preferably, a signal-to-interference ratio estimator decides the signal-to-noise ratio.

Preferably, when the signal-to-noise ratio is low, the signal-to-interference ratio estimator includes a step for fixing a slot number of the non-coherent accumulator.

Preferably, when the signal-to-noise ratio is high, the signal-to-interference ratio estimator transmits a control signal from a Doppler estimator to the non-coherent accumulator as it is.

Preferably, the Doppler estimator transmits a control signal for increasing a slot number to a coherent accumulator and the non-coherent accumulator according to the moving speed of a user equipment.

DETAILED DESCRIPTION OF THE PREFERRED EMBODIMENTS

In general, a Doppler estimator is used to search and recognize signals of a moving UE in a multi-path searcher of a base station modem. However, the Doppler estimator merely considers the moving speed of the UE. Even if the moving speed of the UE is high, if the SNR is low, it is meaningless to give a weight to a non-coherent accumulator. Accordingly, a mean acquisition time taken to recognize received signals is longer in non-coherent multi-slot accumulation than coherent multi-slot accumulation. Moreover, an initial synchronization time may increase and thus wireless resources of a base station may be spent wastefully.

In accordance with the present invention, the Doppler estimator controls a weight intended to be given to the non-coherent accumulator according to the SNR, by adding a signal-to-interference ratio (SIR) estimator. An apparatus and method for recognizing mobile signals in a mobile communication system in accordance with the present invention will now be described with reference to the accompanying drawings.

Figure 5:
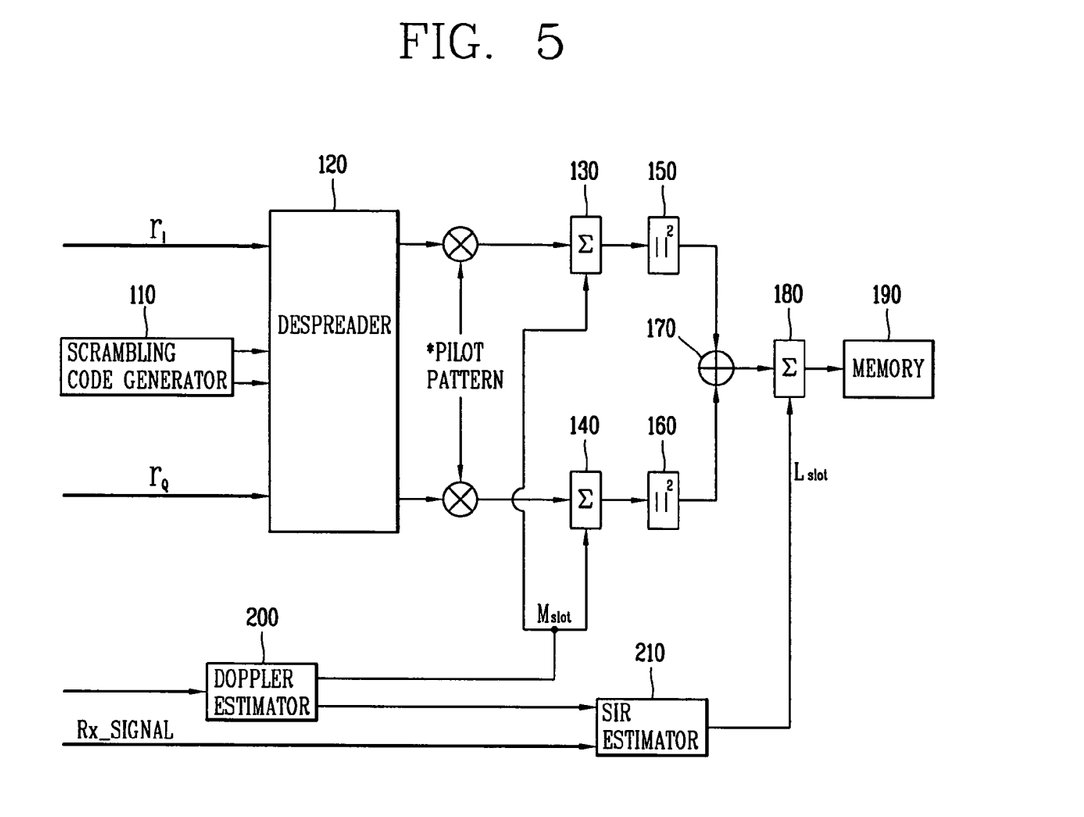
FIG. 5 shows a structure of an apparatus for recognizing signals in a multi-path searcher of a base station modem in accordance with a preferred embodiment of the present invention.

FIG. 5 illustrates a structure of an apparatus for recognizing signals in a multipath searcher of a base station modem in accordance with a preferred embodiment of the present invention. The apparatus for recognizing signals in the multi-path searcher of the base station modem includes a scrambling code generator 110, a despreader 120, a first coherent accumulator 130, a second coherent accumulator 140, a first squaring circuit 150, a second squaring circuit 160, an adder 170, a non-coherent accumulator 180, a memory 190, a Doppler estimator 200 and an SIR estimator 210. Each unit of the apparatus for recognizing signals will now be described in more detail.

The despreader 120 applies a scrambling code signal to an I channel signal $r_1$ and a Q channel signal $r_Q$, input from an UE by CDMA and divided into an I-channel and a Q-channel, to despread the signals. The scrambling code generator 110 generates the scrambling code signal for spreading and transmits the signal to the despreader 120. The Doppler estimator 200 measures the moving speed of the signal from the UE, and transmits a control signal proportional to the moving speed to the first and second coherent accumulators 130 and 140 and the non-coherent accumulator 180.

The SIR estimator 210 analyzes the signal from the UE, searches the SNR of the signal, and corrects or compensates for the control signal transmitted from the Doppler estimator 200 to the non-coherent accumulator 180 according to the searched SNR.

The first coherent accumulator 130 receives $r_1$, accumulates the signal within the slot range according to a corresponding pilot symbol value, re-accumulates the signal in slot units set by the control signal from the Doppler estimator 200, and outputs the resulting signal.

The second coherent accumulator 140 receives $r_Q$, accumulates the signal within the slot range according to a corresponding value of the pilot symbol, re-accumulates the signal in slot units set by the control signal from the Doppler estimator 200, and outputs the resulting signal.

The first and second squaring circuits 150 and 160 square each of the output signals from the first and second coherent accumulators 130 and 140, and extract size elements $E_1$ and $E_Q$ of the signals. The adder 170 adds up the output signals from the first and second squaring circuits 150 and 160, and outputs one signal $E_{total}$.

The non-coherent accumulator 180 accumulates the signal size of the signals from the adder 170, and also accumulates the slot unit signals set by the control signal inputted from the Doppler estimator 200 and controlled by the SIR estimator 210. The memory 190 sequentially stores the output signals from the non-coherent accumulator 180.

The method used by the apparatus for recognizing signals, which receives the CDMA-spread signals from the UE by the base station modem, despreads the received signals, and accumulates the despread signals by pilot symbol values, includes the steps of: receiving the spread signals $r_1$ and $r_Q$, respectively, despreading the input signals by multiplying each of the signals by a PN code value based on the scrambling code and pilot pattern and accumulating the signals according to the pilot symbol values. The moving speed of the UE is then measured by analyzing the signal from the UE in the Doppler estimator, and the control signal for increasing the accumulation slot number is transmitted to the coherent accumulator or non-coherent accumulator according to the measured moving speed of the UE. When the moving speed of the UE is high, a decision is made as to whether the SNR of the signal from the UE is lower than a predetermined level. When the SNR is lower than the predetermined level, the control signal transmitted to the non-coherent accumulator is controlled for increasing the accumulation slot number.

Figure 6:
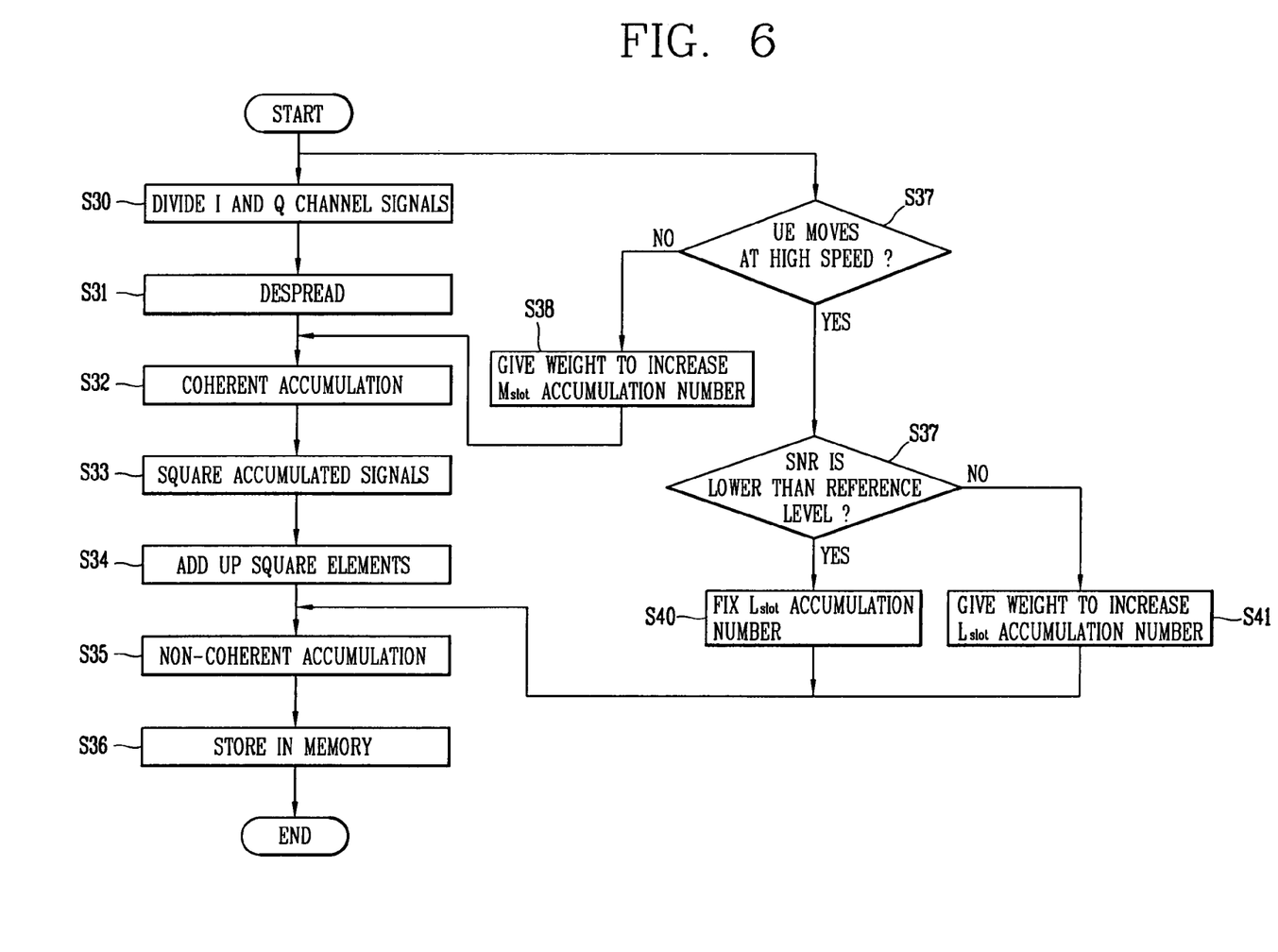
FIG. 6 is a flowchart showing steps included in a process for searching signals using the apparatus for recognizing signals in the multi-path searcher of the base station modem in accordance with the preferred embodiment of the present invention.

FIG. 6 is a flowchart showing steps included in a process for searching signals using the apparatus for recognizing signals in the multi-path searcher of the base station modem in accordance with the preferred embodiment of the present invention. In an initial step, a CDMA-spread signal received in an antenna of the base station from the UE is divided into an I-channel signal $r_1$ and a Q-channel signal $r_Q$, and and these signals are respectively input into the despreader (S30). The despreader applies a scrambling code from the scrambling code generator to each of the signals, despreads the signals, and transmits the signals respectively to the first coherent accumulator and the second coherent accumulator (S31). The coherent accumulator receives the despread signals from the despreader and multiplies the signals by a pilot signal. The calculated symbol unit signals become $N_{pilot}$ pilot symbols.

The first and second coherent accumulators accumulate the input signals $r_1$ and $r_Q$ by the pilot symbol value from the corresponding functional unit, respectively. Here, a slot unit accumulation number is decided according to the control signal from the Doppler estimator and the signals are re-accumulated by the decided number to improve the SNR (S32).

That is, for example, when the pilot symbol value is 6 and the slot number based on the control signal from the Doppler estimator is 3, the input signals are accumulated by 18 times to improve the SNR. The more the accumulation number increases, the more the SNR is improved. However, the mean acquisition time for recognizing received signals may be increased due to increase of the accumulation number. Accordingly, deciding the optimal state is very important, which can be performed by the SIR estimator.

The first and second squaring circuits receive the output signals from the first coherent accumulator and the second coherent accumulator, square the signals, and output the resulting energy values $E_I$ and $E_Q$ respectively (S33). The adder receives the energy values $E_I$ and $E_Q$ from the first and second squaring circuits, adds up the values to $E_{total}$, and transmits the resulting value $E_{total}$ to the non-coherent accumulator (S34). The non-coherent accumulator accumulates $E_{total}$ according to the non-coherent multi-slot accumulation (S35). The memory sequentially stores the output signals from the non-coherent accumulator as searching energy values (S36).

In this process, the signals before the adder are pairs of I and Q signals and each of the blocks is embodied in pairs.

The non-coherent accumulator sets the slot number according to the control signal inputted from the Doppler estimator and corrected or compensated for by the SIR estimator. Thereafter, the non-coherent accumulator accumulates the received signals by the preset slot number, and sequentially stores the signals in the memory.

The Doppler estimator analyzes and processes the received signals from the UE according to the Doppler effects, to decide the moving speed of the UE (S37). When the analyzed moving speed of the UE is lower than a reference level, the Doppler estimator outputs a control signal for increasing a slot number $M_{slot}$ in the first and second coherent accumulators in order to improve the SNR according to the coherent multi-slot accumulation (S38). Conversely, when the analyzed moving speed is higher than the reference level, the Doppler estimator outputs a control signal for increasing a slot number $L_{slot}$ in the non-coherent accumulator in order to increase energy of the signals according to the non-coherent multi-slot accumulation.

However, when the slot number is controlled according to the coherent multi-slot accumulation and the non-coherent multi-slot accumulation using the high or low moving speed of the UE, the mean acquisition time is not taken into consideration. Here, the SIR estimator performs necessary functions, including receiving a signal from the UE, analyzing the signal, and searching the SNR.

That is, the SIR estimator receives speed information of the UE from the Doppler estimator and decides the SNR of the received signal (S39). When the moving speed of the UE is high and the SNR is lower than a predetermined level, the SIR estimator corrects or compensates for the slot number control signal input into the non-coherent accumulator to maintain a fixed slot number, and outputs the resulting control signal (S40). In the case that the moving speed is high and the SNR is higher than the predetermined level, the SIR estimator outputs the control signal from the Doppler estimator for increasing the slot number $L_{slot}$ in the non-coherent accumulator as it is to improve the SNR according to the non-coherent multi-slot accumulation (S41).

As previously discussed, in consideration of influences of the SNR of the received signal, even if the UE moves at a high speed, if the SNR of the received signal is low, the control signal for increasing the slot number based on the non-coherent multi-slot accumulation is corrected or compensated to a fixed slot number. As a result, it is advantageous in the mean acquisition time which is the average searching process time of the multi-path searcher.

In accordance with the present invention, when the SNR of the signal from the UE moving at a high speed is low, the method and apparatus for recognizing signals in the receiving base station of the mobile communication system correct or compensate for the control signal for increasing the accumulation slot number based on the non-coherent multi-slot accumulation showing a relatively long mean acquisition time. As a result, the method and apparatus of the present invention for recognizing signals for improving the mean acquisition time of the received signal can improve performance.

In addition, when the base station modem recognizes and processes the signals of the UE, a signal processing speed and reliability of the system are improved.

Furthermore, an initial synchronization time is reduced by rapidly recognizing the received signal, which results in low consumption of wireless resources of the base station.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A method for recognizing mobile signals in a wireless code division multiple access system, comprising:
measuring a moving speed of a transmitting end;
measuring a signal-to-noise ratio of a signal from the transmitting end; and
controlling a signal searching process of a receiving end coupled to a base station modem to recognize a signal from the transmitting end, said controlling including:
generating a first control signal for setting a first slot number of a non-coherent accumulator to compensate for the moving speed of the transmitting end;
comparing the signal-to-noise ratio to a predetermined level,
generating a second control signal by adjusting the first control signal; and
inputting the second control signal into the non-coherent accumulator, the second control signal changing the first slot number to a second slot number of the non-coherent accumulator to adjust the measured signal-to-noise ratio based on a result of the comparison.

2. The method of claim 1, wherein the transmitting end is user equipment.

3. The method of claim 1, wherein a Doppler estimator measures the moving speed.

4. The method of claim 3, wherein the first control signal generated by the Doppler Estimator is indicative of a weight and wherein the second control signal adjusts the weight based on a result of the comparison of the signal-to-noise ratio to the predetermined level.

5. The method of claim 4, wherein the second control signal adjusts the weight to achieve a desired mean acquisition time of the signal transmitted by the transmitting device.

6. The method of claim 1, wherein a signal to interference ratio estimator measures the signal-to-noise ratio.

7. The method of claim 1, further comprising: setting a weight for the non-coherent accumulator based on the second control signal.

8. The method of claim 1, further comprising: restricting a weight for the non-coherent accumulator based on the second control signal when the signal-to-noise ratio is lower than the predetermined level.

9. The method of claim 1, wherein the second control signal increases the first slot number to the second slot number to achieve a desired mean acquisition time for recognizing the signal transmitted from the transmitting end.

10. The method of claim 1, wherein the second control signal increases the first slot number to the second slot number when the signal-to-noise ratio is lower than the predetermined level.

11. The method of claim 1, wherein the second control signal increases the first slot number to the second slot number to offset a reduction in the signal-to-noise ratio resulting from the first slot number.

12. The method of claim 1, wherein the second control signal increases the first slot number to the second slot number to maintain the signal-to-noise ratio at a substantially constant level.

13. The method of claim 1, wherein the second slot number is set by the second control signal to offset a change produced by the first slot number set by the first control signal.

14. The method of claim 1, wherein the second control signal increases the signal-to-noise ratio above the predetermined level.

15. A method for recognizing signals in a CDMA mobile communication system, comprising:
   despreading a received channel signal and accumulating different components of the despread signal according to coherent multi-slot accumulation, respectively;
   squaring each component of the accumulated signals, and adding up the components to an energy value;
   accumulating the energy value according to non-coherent multi-slot accumulation;
   determining a moving speed of a transmitting end from which said received channel signal is derived;
   determining a signal-to-noise ratio of the signal from the transmitting end; and
   controlling a signal searching process of a receiving end coupled to a base station modem to recognize the signal from the transmitting end, said controlling including:
   generating a first control signal for setting a first slot number for said non-coherent multi-slot accumulation to compensate for the moving speed of the transmitting end;
   generating a second control signal by adjusting the first control signal; and
   performing said non-coherent multi-slot accumulation based on the second control signal, the second control signal changing the first slot number to a second slot number to adjust the measured signal-to-noise ratio.

16. The method of claim 15, wherein the transmitting end is a user equipment, and the receiving end is a multi-path searcher of the base station modem.

17. The method of claim 15, wherein the components of the received channel signal are an in-phase (I) channel signal and a quadrature-phase (Q) channel signal.

18. The method of claim 15, wherein a Doppler estimator decides the moving speed of the transmitting end.

19. The method of claim 15, wherein determining the moving speed includes determining whether the moving speed of the transmitting end is a first speed or a second speed, wherein the first speed is greater than the second speed.

20. The method of claim 15, wherein a signal to interference ratio estimator determines the signal-to-noise ratio.

21. The method of claim 15, wherein, when the moving speed is determined to be higher than a first reference level and the signal-to-noise ratio is higher than a second reference level, the second control signal increases the first slot number to the second slot number.

22. The method of claim 15, wherein, when the signal-to-noise ratio is determined to be below a predetermined value, the second control signal increases the first slot number to the second slot number.

23. The method of claim 15, wherein the second control signal maintains the second slot number to offset a change produced by the first slot number when the moving speed of the transmitting end is above a first reference level and the signal-to-noise ratio is below a second reference level.

24. An apparatus for recognizing mobile signals in a CDMA mobile communication system, comprising:
   a despreader which despreads a received signal into signal components;
   a scrambling code generator which generates a scrambling code for use by the despreader;
   a Doppler estimator which determines a speed of a mobile terminal which transmitted the received signal, and which generates first control information indicative of a first accumulation slot number based on the speed;
   a signal-to-interference ratio estimator which determines a signal-to-noise ratio of the signal received from the mobile terminal, and which generates a second control information by adjusting the first control information, the second control information changing the first accumulation slot number to a second accumulation slot number to adjust the measured signal-to-noise ratio;
   a coherent accumulator which receives the despread signal components, and accumulates the signal components in slot units;
   a squaring circuit which squares each of the signal components accumulated in the coherent accumulator;
   an adder which adds size elements extracted by the squaring circuit;
   a non-coherent accumulator which accumulates a signal size added by the adder and controls an accumulation slot number based on the second control information from the signal-to-interference ratio estimator; and
   a memory which stores output signals from the non-coherent accumulator.

25. The apparatus of claim 24, wherein the despreader despreads the received signal into an in-phase (I) channel signal component and a quadrature-phase (Q) channel signal component.

26. The apparatus of claim 24, wherein the Doppler estimator determines the speed of the mobile terminal by determining whether the speed is a first speed or a second speed, wherein the first speed is greater than the second speed.

27. The apparatus of claim 24, wherein, when the determined moving speed of the mobile terminal is determined to be higher than a reference level, the Doppler estimator transmits the first control information to the signal-to-interference ratio estimator to generate the second control information for increasing the first accumulation slot number for the non-coherent accumulator.

28. The apparatus of claim 24, wherein, when the signal-to-noise ratio is determined to be below a predetermined value, the signal-to-interference ratio estimator increases the first accumulation slot number to the second accumulation slot number for input into the non-coherent accumulator to a fixed slot number.

29. The apparatus of claim 24, wherein the coherent accumulator comprises:
   a first coherent accumulator which receives an in-phase (I) channel signal component of the received signal; and
   a second coherent accumulator which receives a quadrature-phase (Q) channel signal component of the received signal.

30. The apparatus of claim 24, wherein the squaring circuit comprises:
   a first squaring circuit which receives a signal from the first coherent accumulator; and
   a second squaring circuit which receives a signal from the second coherent accumulator.

31. The apparatus of claim 24, wherein the squaring circuit squares each of the signals and outputs energy values.

32. The apparatus of claim 24, wherein the adder adds energy values and outputs an energy value which is a signal size in a corresponding phase.

33. The apparatus of claim 24, wherein the coherent accumulator receives the despread signal components, accumulates the signal components within a slot range by a corresponding pilot symbol value, and re-accumulates the signal components in slot units set by a corresponding control signal from the Doppler estimator.

* * * * *